Figure 3:
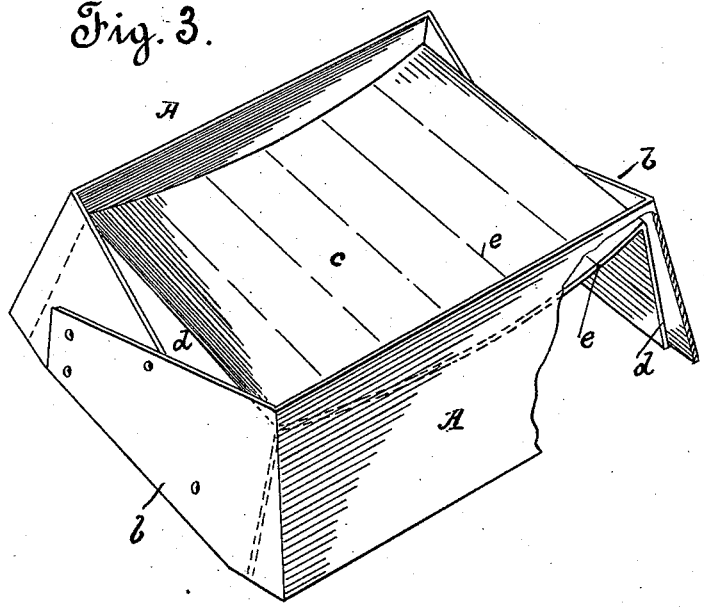

(No Model.)  C. W. WESTON.  2 Sheets—Sheet 1.
VENTILATED FRUIT BASKET.
No. 528,834.  Patented Nov. 6, 1894.
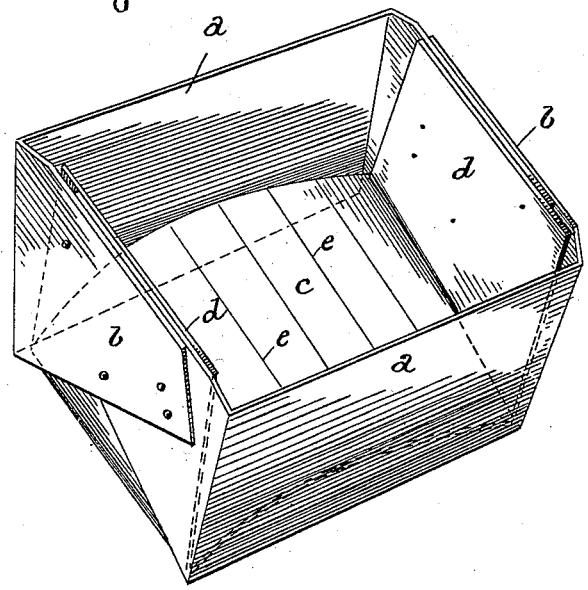
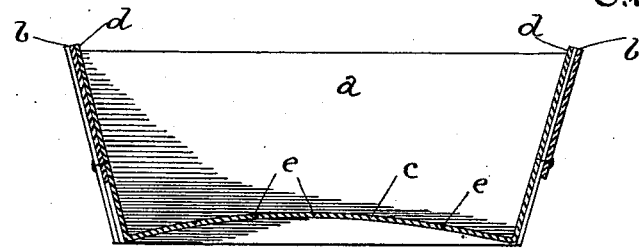
Witnesses.  Inventor.

(No Model.) 2 Sheets—Sheet 2.

C. W. WESTON.
VENTILATED FRUIT BASKET.

No. 528,834. Patented Nov. 6, 1894.

Witnesses.
S. E. Monteverde.
James T. Bloomfield.

Inventor.
Charles W. Weston
per his attorney
G. M. Spencer

UNITED STATES PATENT OFFICE.

CHARLES W. WESTON, OF SAN FRANCISCO, CALIFORNIA.

VENTILATED FRUIT-BASKET.

SPECIFICATION forming part of Letters Patent No. 528,834, dated November 6, 1894.

Application filed March 12, 1894. Serial No. 503,351. (No model.)

*To all whom it may concern:*

Be it known that I, CHARLES W. WESTON, a citizen of the United States, residing at San Francisco, in the county of San Francisco and State of California, have invented a certain new and useful Improvement in Ventilated Fruit-Baskets Made of Wood Veneering Material, of which the following is a specification.

My invention relates to improvements in ventilated fruit baskets made of wood veneering material, by so elevating the bottom surface of the basket (which, as heretofore made, rested upon or was brought closely in contact with the surface upon which it was placed, thus excluding the air) gradually from its two ends or sides toward the center, that it shall take a circular shape, thus allowing the air to circulate freely under the basket, by means of which device or arrangement of the bottom, no outside portion of it is excluded from the air, and the fruit contained in the bottom of the basket is preserved in a much cooler and drier condition, the current of air under the bottom part tending to dispel the moisture and to keep the fruit in a dry condition.

The object of my invention is to provide a light fruit basket made of wood veneering material with the bottom part so constructed that it shall be elevated gradually from the two sides or ends when fastened, toward the center or middle part, thus affording a free circulation of air under the bottom of the basket for the purpose of dispelling much of the moisture and for preserving and keeping the fruit contained in the basket dry, so that it may be much longer held in a good and marketable condition.

The elevation of the bottom part is effected by making slits or incisions across the upper side of the bottom veneering piece at right angles with the sides at distances of about one inch or so apart and at a depth of one-third or one-half of the thickness of the wood, and then by pushing upward on the under side of said bottom piece, the slits or incisions on the upper side are caused to open somewhat, and when raised sufficiently the ends or extremities of said piece (which are bent at the point where it meets the lower edge of the sides of the basket so as to extend upward on the inside to the upper edge of the same) may be fastened to the ends or sides of the body part of the basket, thus leaving the bottom in a fixed elevated position for the free passage of air beneath it. I attain these objects by the mechanism illustrated in the following drawings.

Figure 4:
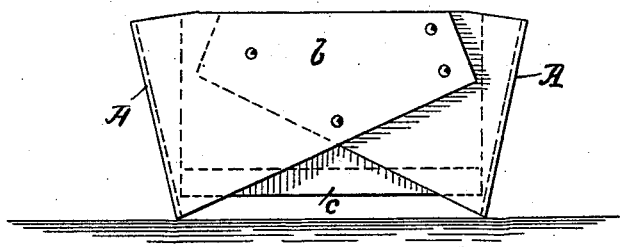

Figure 1 is a perspective view of the basket. Fig. 2 is a horizontal side sectional view. Fig. 3 is a perspective view of the basket, partly broken. Fig. 4 is a vertical end elevation of the basket.

$a$ represents the sides of the basket, and $b$, the ends of the same, formed by bending the ends of two strips of the veneering material so as to overlap each other and be fastened together, thus constituting the body of the basket.

$c$ represents the raised bottom part, and $d$, the ends of the same extending upward on the inside to the upper edge of the body part and fastened thereto; $e$, the slits or incisions on the upper side of the bottom.

What I claim as my invention, and desire to secure by Letters Patent of the United States, is—

1. A ventilated fruit basket made of wood veneering, consisting of two veneer strips comprising the sides bent at right angles to form the ends, when overlapped and fastened the one upon the other for the body part, combined with a continuous veneer strip, $d, c, d$, longer than the space it is intended to occupy, so that it is forced to assume a curved, or oval shape, when placed in position and fastened to the inside of the ends of said body parts, which, when so constructed, rests upon its two sides and allows a free circulation of air beneath,—substantially as herein described and set forth.

2. In a ventilated fruit veneer basket, the combination of the body part A. and $b$, and a continuous veneer strip, $d, c, d$, longer than the space it is intended to occupy, so that it is forced to assume a curved oval shape when placed in position and fastened to the inside of the ends of the body part, which, when so constructed rests upon its two sides, and allows a free circulation of air beneath, substantially as herein described and set forth.

3. In a ventilated fruit veneer basket, the combination of the body part, A and b, and a continuous veneer strip, d, c, d, slitted on its upper surface longer than the space it is intended to occupy, so that it is forced to assume a curved or oval shape when placed in position and fastened to the ends of the body part, which, when so constructed rests upon its two sides and allows a free circulation of air beneath, substantially as herein described and set forth.

CHARLES W. WESTON.

Witnesses:
JAMES T. BLOOMFIELD,
PETER J. BOURDETTE.